United States Patent
Moriya et al.

[11] Patent Number: 5,401,146
[45] Date of Patent: Mar. 28, 1995

[54] PUMP CASING MADE OF SHEET METAL

[75] Inventors: Masayoshi Moriya; Makoto Kobayashi; Masakazu Yamamoto; Yoshio Miyake; Hiromi Sakacho; Koji Isemoto, all of Kanagawa; Seigo Katsuta, Tokyo; Kunihiko Fujii, Tokyo; Kikuichi Mori, Tokyo, all of Japan

[73] Assignee: Ebara Corporation, Tokyo, Japan

[21] Appl. No.: 45,693

[22] Filed: Apr. 14, 1993

[30] Foreign Application Priority Data

| Apr. 14, 1992 | [JP] | Japan | 4-120169 |
| Apr. 14, 1992 | [JP] | Japan | 4-120170 |
| Apr. 14, 1992 | [JP] | Japan | 4-120171 |
| Apr. 14, 1992 | [JP] | Japan | 4-120178 |
| Apr. 14, 1992 | [JP] | Japan | 4-120180 |
| Jun. 5, 1992 | [JP] | Japan | 4-171686 |
| Jun. 5, 1992 | [JP] | Japan | 4-171692 |

[51] Int. Cl.[6] ............................................. F04B 17/00
[52] U.S. Cl. ......................... 417/423.14; 415/214.1; 403/338
[58] Field of Search ............ 417/423.14, 423.3, 423.8, 417/423.15, 357; 415/182.1, 214.1; 403/337, 338

[56] References Cited

U.S. PATENT DOCUMENTS

| 2,397,169 | 3/1946 | Troller et al. | 417/423.14 |
| 2,709,567 | 5/1955 | Wood | 417/423.8 |
| 2,997,958 | 8/1961 | Heinicke . | |
| 3,059,582 | 10/1962 | Greene et al. . | |
| 3,153,382 | 10/1964 | Van Blarcom, Jr. | 417/423.3 X |
| 3,229,896 | 1/1966 | Levy | 417/423.8 |
| 3,333,544 | 8/1967 | Turk | 417/357 |
| 3,775,024 | 11/1973 | Ulm et al. | 417/423.3 |
| 3,936,243 | 2/1976 | Gakenholz | 417/423.3 |
| 4,172,695 | 10/1979 | Uesugi . | |
| 4,684,329 | 8/1987 | Hashimoto | 417/357 |
| 4,810,174 | 3/1989 | Stuckey et al. | 417/423.14 |

FOREIGN PATENT DOCUMENTS

| 0267445 | 5/1988 | European Pat. Off. . | |
| 1361954 | 4/1964 | France . | |
| 3517828 | 11/1986 | Germany . | |
| 3729673 | 3/1989 | Germany . | |
| 1233361 | 5/1989 | Italy . | |
| 1308315 | 2/1973 | United Kingdom | 417/423.14 |

*Primary Examiner*—Richard A. Bertsch
*Assistant Examiner*—Peter Korytnyk
*Attorney, Agent, or Firm*—Oblon, Spivak, McClelland, Maier & Neustadt

[57] ABSTRACT

A pump casing made of sheet metal has an outer casing having a suction nozzle, and an inner casing housed in said outer casing and spaced therefrom. A resilient seal is disposed in a gap defined between the outer casing and an inner casing. An impeller is rotatably disposed in the inner casing with a clearance defined between a liner portion of the inner casing and the impeller. The resilient seal is effective to absorb deformations of the outer casing, such deformations of the outer casing are not transmitted to the inner casing.

53 Claims, 14 Drawing Sheets

PUMP CASING MADE OF SHEET METAL

BACKGROUND OF THE INVENTION

1. Field of the Invention

The present invention relates to a pump casing made of sheet metal, and more particularly to a pump casing which is made of sheet metal such as stainless steel plate and formed by press working.

2. Description of the Related Art

It has been customary to press sheet steel such as stainless steel into a pump casing according to a deep drawing process, and then weld or otherwise fasten suction or discharge flanges to the pressed pump casing. The pump casing thus fabricated is liable to be deformed due to the internal pressure developed in the pump casing itself and also due to external forces applied to the pump casing from a piping connected thereto. Any deformation that the pump casing suffers should be reduced to such a level that the pump casing will never be in contact with the impeller housed in the pump casing. Therefore, the pressed pump casing must meet mechanical strength requirements for bearing loads including external forces applied from the connected piping and an internal pressure developed in the pump casing, and also rigidity requirements for keeping a desired clearance between a liner ring and the impeller.

Inasmuch as the pressed pump casing is a relatively flexible structure with respect to applied loads, however, it is impossible for the pressed pump casing itself to satisfy both the mechanical strength requirements and the rigidity requirements. To achieve a desired level of rigidity, conventional pressed pump casings have employed a steel sheet whose thickness is greater than the thickness required to withstand an internal pressure developed therein, or a reinforcing member of complex shape disposed between the suction flange and the pump casing for reinforcing them.

One known pressed pump casing with a reinforcing member is disclosed in German DE-OS 3517828. As shown in FIG. 18 of the accompanying drawings, the disclosed arrangement includes a reinforcing member 64 of complex shape, called a box guarder, which is positioned between a pump casing 61 and a suction flange 62 in surrounding relationship to a suction nozzle 63.

The increased thickness of the sheet steel or the reinforcing member disposed between the pump casing and the suction flange is effective to prevent either the pump casing housing the liner ring from being deformed or a liner section of the pump casing from being deformed, so that a desired clearance is maintained between the liner ring or the liner section of the pump casing and the impeller.

As described above, in order to prevent the pump casing or the liner portion thereof from being deformed, the rigidity of the pump casing has been increased by employing either a steel sheet whose thickness is greater than the thickness required to withstand an internal pressure developed in the pump casing or a reinforcing member of complex shape disposed between the suction flange and the pump casing for reinforcing them. The steel sheet of increased thickness is, however, difficult to press to shape, and the reinforcing member of complex shape results in an increase in the cost of manufacture of the pump casing.

On the other hand, there have been known full-circumferential flow pumps which have an annular fluid passage between a pump casing and a motor accommodated in the pump casing. In general, the full-circumferential flow pump has a pump casing comprising a suction-side casing, a discharge-side casing, and an outer cylinder extending between the suction-side casing and the discharge-side casing. The suction-side casing and the discharge-side casing are generally highly rigid as they are each made of a casting such as an iron casting.

The full-circumferential pump also includes a canned (sealed) motor fixedly supported in the rigid suction- and discharge-side casings.

The canned motor can be fixedly supported in the suction- and discharge-side casings because they are in the form of rigid castings. If these casings comprise sheets pressed to shape, on the other hand, the canned motor cannot fixedly be supported in the casings because they are not sufficiently rigid.

SUMMARY OF THE INVENTION

It is therefore an object of the present invention to provide a pump casing which has a liner portion which is prevented from being deformed and which is made of a metal sheet whose thickness is not greater than that necessary to withstand external forces applied to the pump casing from a piping connected thereto and an internal pressure developed in the pump casing, and which has no reinforcing member for reinforcing the pump casing.

Another object of the present invention is to provide a full-circumferential flow pump which has a canned motor securely supported in a pump casing which comprises pressed sheets.

According to an aspect of the present invention, there is provided a pump casing made of sheet metal comprising: an outer casing made of sheet metal; an inner casing housed in said outer casing and spaced therefrom for accommodating an impeller therein, said inner casing having a portion made of sheet metal; a resilient seal disposed between said outer casing and said inner casing, and means mounted to said outer casing for connection of the pump casing to a fluid conduit.

With the above structure, the resilient seal is effective to absorb deformations of the outer casing due to external forces applied thereto from a piping connected to the outer casing, and hence such deformations of the outer casing are not transmitted to the inner casing. The inner casing is thus prevented from being substantially deformed under pressure. Since the outer casing is not required to be excessively rigid, the outer casing is not required to have a thickness greater than that necessary to withstand the internal pressure developed in the pump casing, and not required to be reinforced by a special reinforcing member. With the inner casing having the liner portion, it is easy to maintain a clearance between the liner portion and the impeller. The inner casing may also be of a small thickness as it is free from loads due to external forces applied from the piping connected to the outer casing. Consequently, the inner casing may also easily be pressed to shape with high accuracy.

According to another aspect of the present invention, there is also provided a full-circumferential flow pump having a circumferential fluid passage between a pump casing and an outer circumferential surface of a motor provided in said pump casing, the pump casing comprising: a suction-side casing made of sheet metal and having a suction nozzle; an inner casing housed in said suction-side casing for accommodating an impeller therein; and sealing means made of resilient material for preventing a pumped fluid from leaking towards a suction side of said impeller, and means mounted to said outer casing for connection of the pump casing to a fluid conduit.

According to still another aspect of the present invention, there is provided a full-circumferential flow pump having a circumferential fluid passage between a pump casing and an outer surface of a motor provided in said pump casing, the pump casing comprising: a suction-side casing made of sheet metal and having a suction nozzle; an outer cylinder made of sheet metal and connected to said suction-side casing, said outer cylinder accommodating said motor therein; and fixing means for fixing said motor to said outer cylinder, said fixing means including a plurality of ribs projecting outwardly from a frame outer barrel of said motor, said ribs being fitted in said outer cylinder.

Since the motor is joined to the outer cylinder of the pump casing through the motor frame outer barrel reinforced by the ribs, the motor is fixedly supported by the pump casing. The ribs can easily be formed on the motor frame outer barrel by embossing.

According to still another aspect of the present invention, there is provided a full-circumferential flow pump having a circumferential fluid passage between a pump casing and an outer surface of a motor provided in said pump casing, the pump casing comprising: a suction-side casing made of sheet metal and having a suction nozzle; an outer cylinder made of sheet metal and connected to said suction-side casing, said outer cylinder accommodating said motor therein; and fixing means for fixing said motor to said outer cylinder, said fixing means including a plurality of ribs projecting inwardly from said outer cylinder, said ribs being fitted over a frame outer barrel of said motor.

Since the motor is joined to the outer cylinder reinforced by the ribs through the motor frame outer barrel, the canned motor is fixedly supported by the outer cylinder of the pump casing. The ribs can easily be formed on the outer cylinder by embossing.

BRIEF DESCRIPTION OF THE DRAWINGS

The above and other objects, features, and advantages of the present invention will become apparent from the following description when taken in conjunction with the embodiments of accompanying drawings which illustrate preferred embodiments of the present invention by way of example, wherein.

DETAILED DESCRIPTION OF THE PREFERRED EMBODIMENTS

An embodiment of the present invention will be described below with reference to FIGS. 1 and 2.

Figure 1:
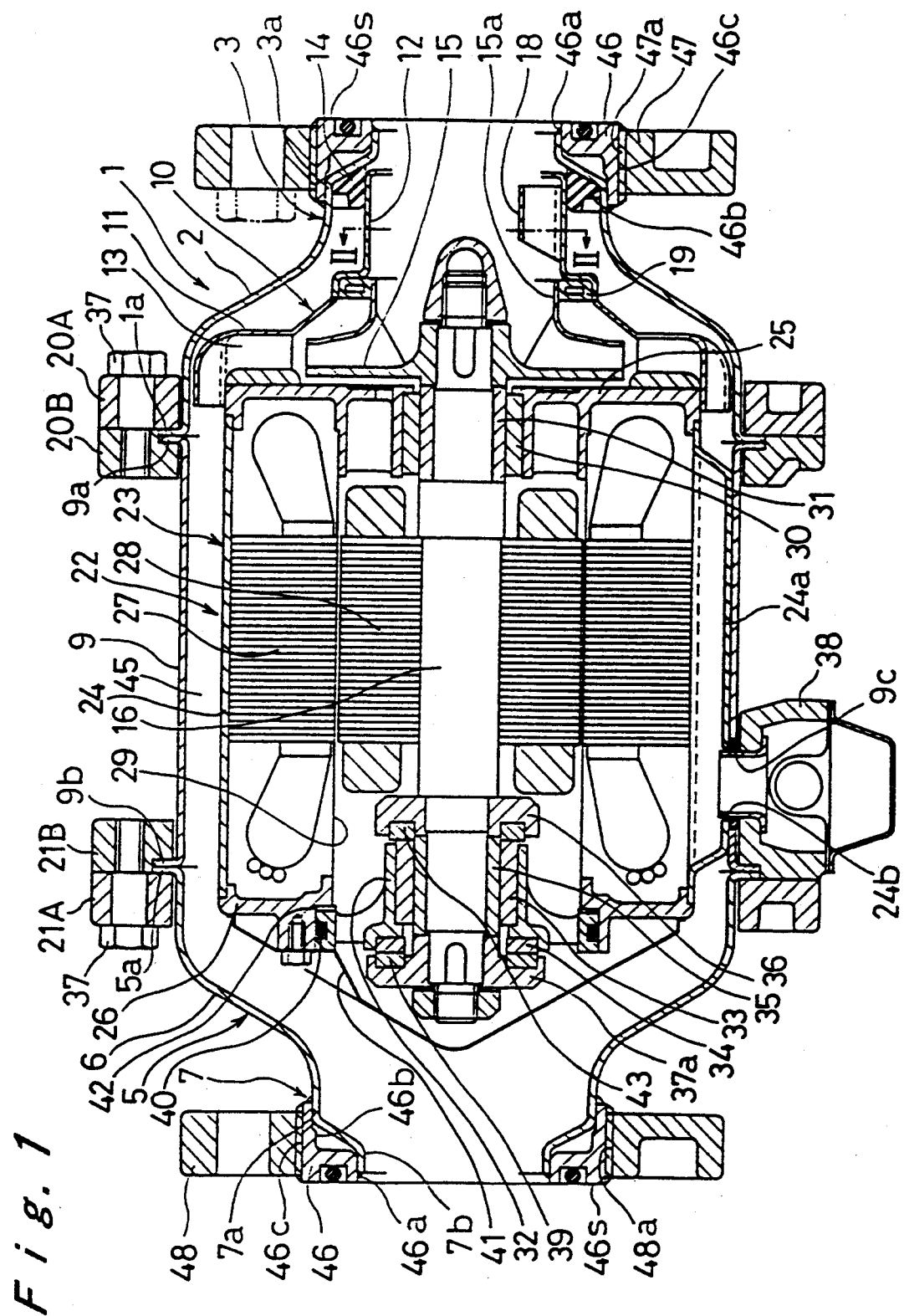
FIG. 1 is a cross-sectional view of a full-circumferential flow in-line pump according to a first embodiment of the present invention.
Figure 2:
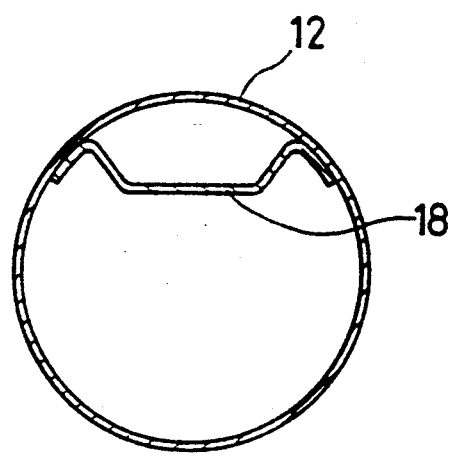
FIG. 2 is a cross-sectional view taken along line II—II of FIG. 1.

FIG. 1 shows in cross section a full-circumferential flow in-line pump having a pump casing made of sheet metal according to an embodiment of the present invention. As shown in FIG. 1, the full-circumferential flow in-line pump generally comprises a suction-side casing 1, a discharge-side casing 5, and an outer cylinder 9 interconnecting the suction-side casing 1 and the discharge-side casing 5. The suction-side casing 1 and the discharge-side casing 5 are formed by press working from a metal-sheet such as stainless steel plate. The outer cylinder 9 is also formed from a metal-sheet such as stainless steel plate. The suction-side casing 1, the discharge-side casing 5, and the outer cylinder 9 have respective flanges 1a, 5a, 9a, 9b extending radially outwardly from open ends thereof. The adjacent flanges 1a, 9a of the suction-side casing 1 and the outer cylinder 9 are clamped by flanges 20A, 20B in the form of castings such as iron castings, and securely fastened to each other by bolts 37 which join the flanges 20A, 20B. Similarly, the adjacent flanges 5a, 9b of the discharge-side casing 5 and the outer cylinder 9 are clamped by flanges 21A, 21B in the form of castings such as iron castings, and securely fastened to each other by bolts 37 which join the flanges 21A, 21B. Each of the flanges 20B, 21B is composed of two separable flange members. The suction-side casing 1, the discharge-side casing 5, and the outer cylinder 9 jointly serve as a pump casing, which houses a canned motor 22.

The suction-side casing 1 comprises a frustoconical body 2 and a cylindrical suction nozzle 3 extending axially into a suction region from the frustoconical body 2. similarly, the discharge-side casing 5 comprises a frustoconical body 6 and a cylindrical discharge nozzle 7 extending axially into a discharge region from the frustoconical body 6. The suction-side casing 1 and the discharge-side casing 5 are identical in dimension and shape to each other. The suction nozzle 3 and the discharge nozzle 7 define respective suction and discharge ports that are positioned axially in line with each other.

The full-circumferential flow in-line pump also has an inner casing 10 disposed radially inwardly of the suction-side casing 1. The inner casing 10 made of sheet metal comprises a cup-shaped body 11 and a cylindrical suction portion 12 extending axially from the cup-shaped body 11 into the suction region. A guide device 13, which defines guide vanes or a volute, is mounted on a radially inner surface of the cup-shaped body 11 of the inner casing 10. The guide device 13 is fitted over a motor frame 23 of the canned motor 22 in a socket-and-spigot joint. The motor frame 23 of the canned motor 22 is a highly rigid structure pressed from a sheet and the guide device 13 is supported on the motor frame 23 of the canned motor 22. As a result, the inner casing 10 is supported by the highly rigid motor frame 23 of the canned motor 22. The suction portion 12 of the inner casing 10 has an axial end extending into the suction nozzle 3. A resilient seal 14 made of rubber or the like is disposed in an annular gap defined between the end of the suction portion 12 and the suction nozzle 3 to seal a suction side (low-pressure side) in the pump from a discharge side (high-pressure side) in the pump.

The full-circumferential flow in-line pump also has an impeller 15 rotatably disposed in the inner casing 10. The impeller 15 is coupled to and supported by a free axial end of a main shaft 16 coupled to the canned motor 22. A rotation prevention plate 18, which is of a substantially U-shaped cross section as shown in FIG. 2, is welded or otherwise secured at its outer edges to a radially inner surface of the suction portion 12. A liner ring 19 is disposed between adjacent portions of the body 11 and the suction portion 12, with a slight clearance defined between the liner ring 19 and a suction-side axial end 15a of the impeller 15.

Suction and discharge flanges 47, 48 are fixed respectively to the suction nozzle 3 and the discharge nozzle 7 through intermediate rings 46. Each of the intermediate rings 46 is made of the same material, such as stainless steel, as the pump casing, and has a central opening 46a, an annular recess 46b, and an externally threaded surface 46c. Each of the intermediate rings 46 has a front end surface 46s serving as a seal surface for mating with another flange (not shown) to be coupled to the suction or discharge flange. The suction nozzle 3 has a smaller-diameter potion 3b inserted into the opening 46a of the corresponding intermediate ring 46 and welded thereto. The suction nozzle 3 also has a larger-diameter portion 3a fitted in the recess 46b of the corresponding intermediate ring 46 in a socket-and-spigot joint and welded thereto. Likewise, the discharge nozzle 7 has a smaller-diameter potion 7b inserted into the opening 46a of the corresponding intermediate ring 46 and welded thereto. The discharge nozzle 7 also has a larger-diameter portion 7a fitted in the recess 46b of the corresponding intermediate ring 46 in a socket-and-spigot joint and welded thereto. The suction and discharge flanges 47, 48 are made of a material such as cast iron (FC) or the like, which is different from the material of the pump casing, and have internally threaded surfaces 47a, 48a, respectively, that are threaded over the respective externally threaded surfaces 46c of the intermediate rings 46. Thus, the suction and discharge flanges 47, 48 are fastened to the respective intermediate rings 46 through threaded engagement.

Figure 3:
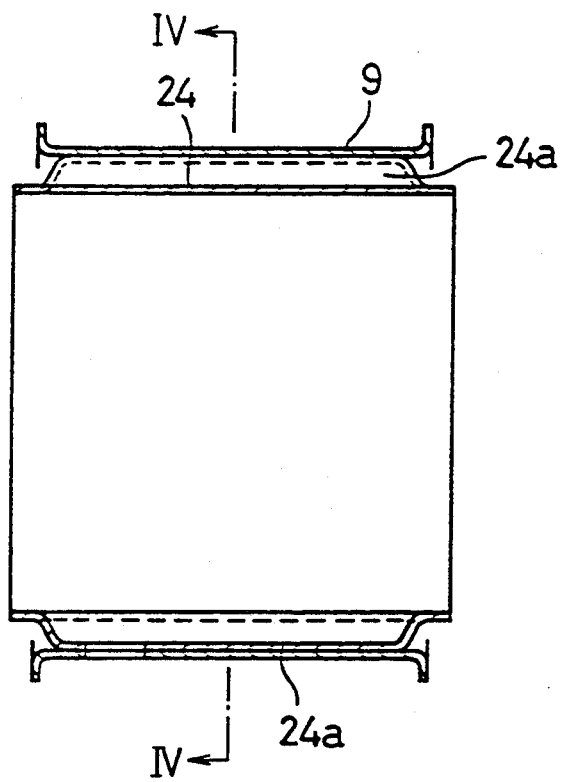
FIG. 3 is a cross-sectional view of a motor frame and an outer cylinder of the full-circumferential flow in-line pump shown in FIG. 1.
Figure 4:
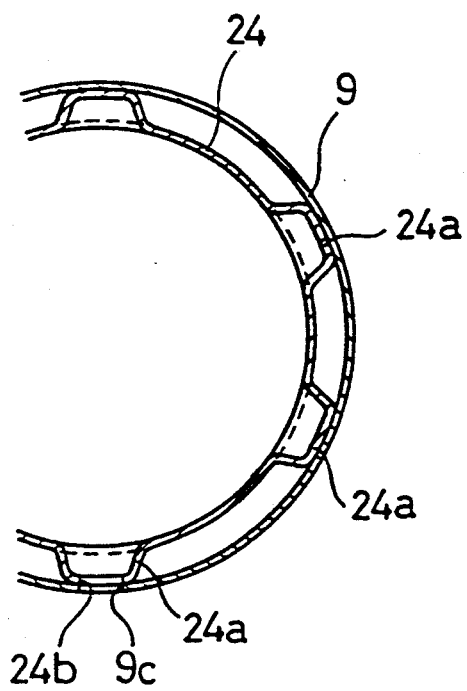
FIG. 4 is a cross-sectional view taken along line IV—IV of FIG. 3.

The motor frame 23 of the canned motor 22 comprises a cylindrical frame outer barrel 24 and frame side plates 25, 26 provided on both sides of the frame outer barrel 24. As shown in FIGS. 3 and 4, the frame outer barrel 24 has a plurality of axial ribs 24a projecting radially outwardly from an outer circumferential surface thereof. The ribs 24a are integrally formed with the motor frame outer barrel 24 by embossing, and have outer surfaces fitted in and spot-welded or otherwise joined to the outer cylinder 9 of the pump casing.

One of the ribs 24a has a lead hole 24b through which leads of the motor 22 extend. The leads also extend through an opening 9c (FIG. 1) defined in the outer cylinder 9 into a terminal box 38 that is integrally formed with the flange 21B.

The canned motor 22 has a stator 27 and a rotor 28 that are disposed in the motor frame outer barrel 24. The rotor 28 is supported on the main shaft 16 and disposed radially inwardly of the stator 27. A cylindrical can 29 is fitted in the stator 27 which is fixedly positioned in the motor frame outer barrel 24. A radial bearing 30 is provided on the frame aide plate 25 to support a shaft sleeve 31 fitted over the main shaft 16.

A bearing housing 32 is detachably fastened to the frame side plate 26 with a resilient O-ring 40 being interposed between the bearing housing 32 and the frame side plate 26. The bearing housing 32 and the frame side plate 26 are joined to each other by a socket and spigot joint with a clearance fit with the O-ring 40 disposed therein. The bearing housing 32 is also prevented from being axially dislodged from the frame side plate 26 by a holder plate 41 fixed to the frame side plate 26. A resilient member 42 such as rubber is disposed in an axial gap between the bearing housing 32 and the frame side plate 26. The bearing housing 32 supports a radial bearing 33 on its radially inner surface and a stationary thrust bearing 34 on its axially outer surface. A shaft sleeve 35 fitted over an opposite end portion of the main shaft 16 is rotatably supported by the radial bearing 33.

Two thrust disks 36, 37a are fixedly mounted to the opposite end portion, i.e., a discharge-side end portion, of the main shaft 16 for axially sandwiching the bearing housing 32. The thrust disk 36 holds a thrust bearing 43 rotatable with the main shaft 16 and facing an axially inner and surface of the radial bearing 33 which provides a stationary thrust sliding surface. The thrust disk 37a holds a thrust bearing 39 rotatable with the main shaft 16 and faces an axially outer end surface of the stationary thrust bearing 34.

The full-circumferential-flow in-line pump shown in FIGS. 1 through 4 operates as follows: A fluid drawn from the suction nozzle 3 flown through the suction portion 12 of the inner casing 10 into the impeller 15. The fluid is then radially outwardly discharged by the impeller 15, and directed by the guide device 13 to flow axially through an angular fluid passage 45 radially defined between the outer cylinder 9 and the motor frame outer barrel 24 of the canned motor 22. The fluid then flows from the annular fluid passage 45 into the discharge casing 5. Thereafter, the fluid is discharged from the discharge nozzle 7 that is integrally formed with the discharge casing 5.

In the above embodiment, the pump casing is divided into the suction-side outer and inner casings 1, 10 that are sealed from each other by the resilient seal 14 across which the differential pressure between the suction and discharge pressures is applied. Since the resilient seal 14 is effective to absorb deformations of the suction-side outer casing 1, such deformations of the suction-side outer casing 1 are not transmitted to the inner casing 10. Any pressure-induced deformation of the inner casing 10 is small as the inner pressure developed in the inner casing 10 is relatively low. Inasmuch as the inner casing 10 is not substantially deformed, there is maintained a clearance between the inner casing 10 and the impeller 15 for keeping the inner casing 10 out of contact with the impeller 15.

Since the inner casing 10 is supported by the canned motor 22 in a spaced relationship to the suction-side casing 1, vibration and noise of the canned motor 22 are not transmitted to the suction-side casing 1 through the inner casing 10. This structure of the pump casing is suitable for prevention of propagation of vibration and noise of the canned motor 22. More generally, perturbations of the outer casing and the inner casing are substantially absorbed by the resilient seal and transmission of the perturbations is substantially inhibited.

Further, the canned motor 22 is fixedly supported by the pump casing through the ribs 24a. Therefore, no special parts are required to support the canned motor 22. Thus, the number of parts of the in-line pump remains relatively small. Inasmuch as the ribs 24a of the motor frame outer barrel 24 and the outer cylinder 9 of the pump casing are spot-welded to each other, they can easily be joined together. The rigidity of the motor frame outer barrel 24 is increased because of the ribs 24a thereon.

A full-circumferential flow in-line pump according to a second embodiment of the present invention will be described below with reference to FIGS. 5 through 7. Those parts shown in FIG. 5 which are structurally and functionally identical to or similar to those shown FIG. 1 are denoted at identical reference numerals, and explanation thereof will be omitted.

In the second embodiment, the inner casing 10 comprises a first cup-shaped inner casing 11a enclosing the impeller 15, and a second cylindrical inner casing 12a fitted over the first inner casing 11a and extending to the vicinity of the suction nozzle 3. A resilient seal 14 is provided between the inner casing 10 and the suction side casing 1 and seals the suction side (low-pressure side) in the pump from the discharge side (high-pressure side) in the pump.

Further, a resilient seal 44 such as an O-ring is interposed between the first inner casing 11a and the second inner casing 12a. The second inner casing 12a is pushed toward the first inner casing 11a by the differential pressure between the suction and discharge pressures which is applied to an annular area. Thus, the resilient seal 44 is deformed by a certain amount to perform sealing. The first inner casing 11a houses the guide device 13 which defines guide vanes or a volute. The guide device 13 is fitted over the motor frame 23 of the canned motor 22.

Figure 5:
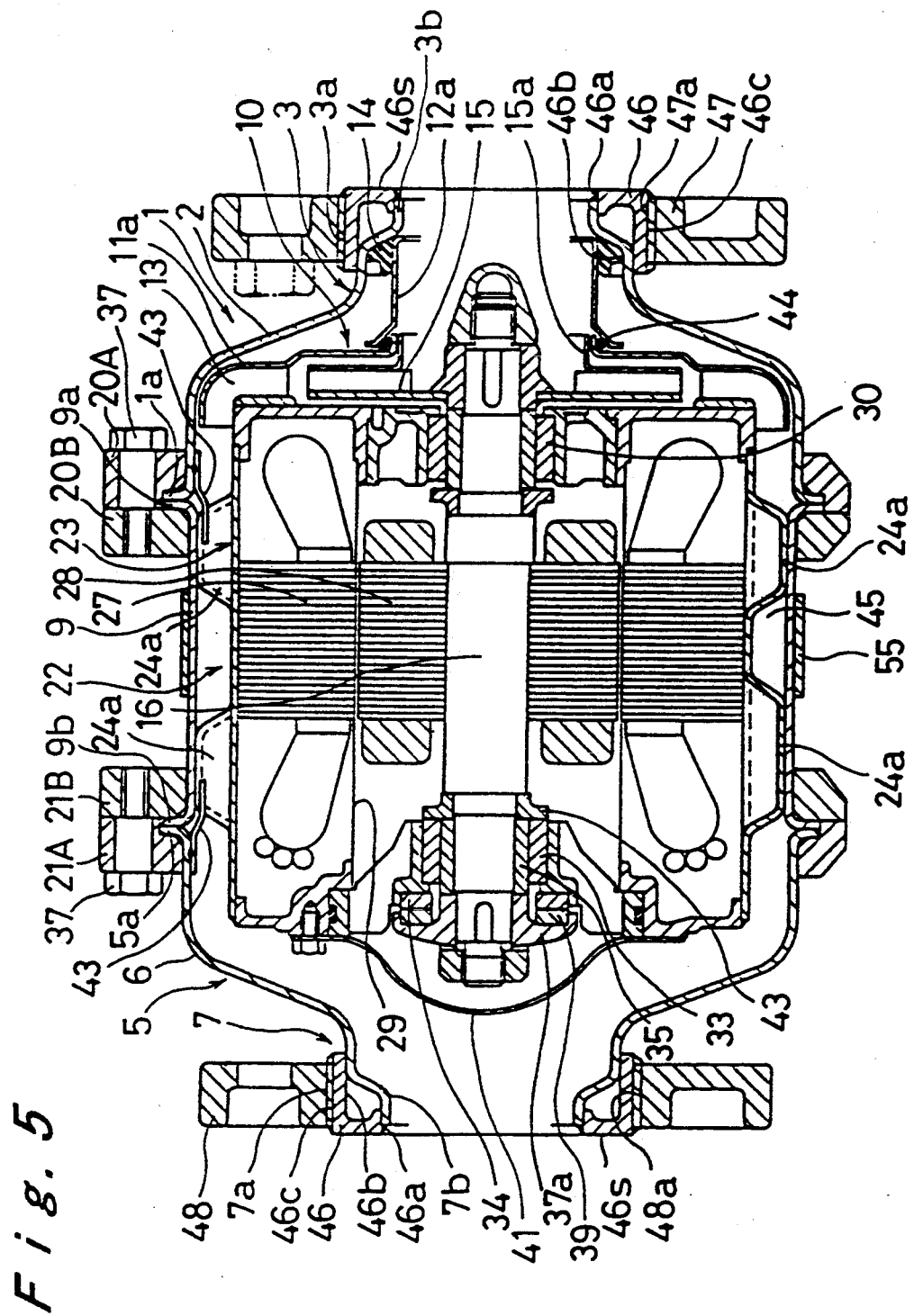
FIG. 5 is a cross-sectional view of a full-circumferential flow in-line pump according to a second embodiment of the present invention.
Figure 6:
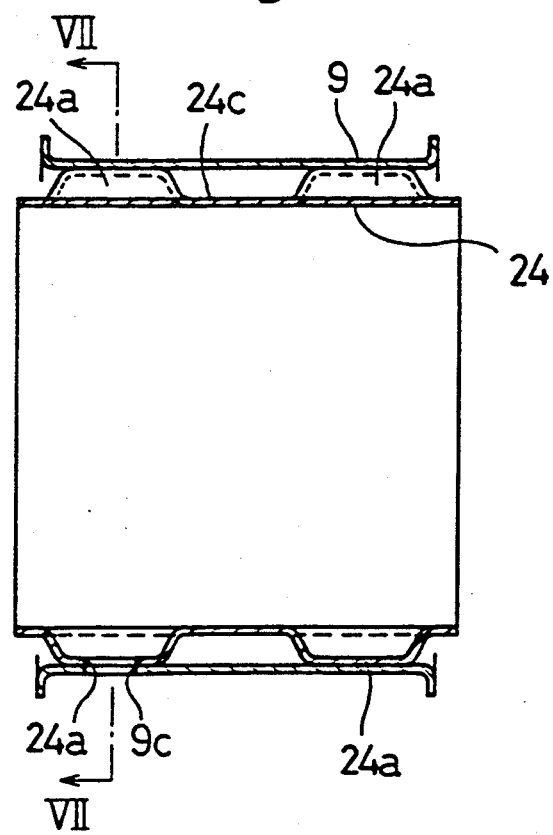
FIG. 6 is a cross-sectional view of a motor frame and an outer cylinder of the full-circumferential flow in-line pump shown in FIG. 5.
Figure 7:
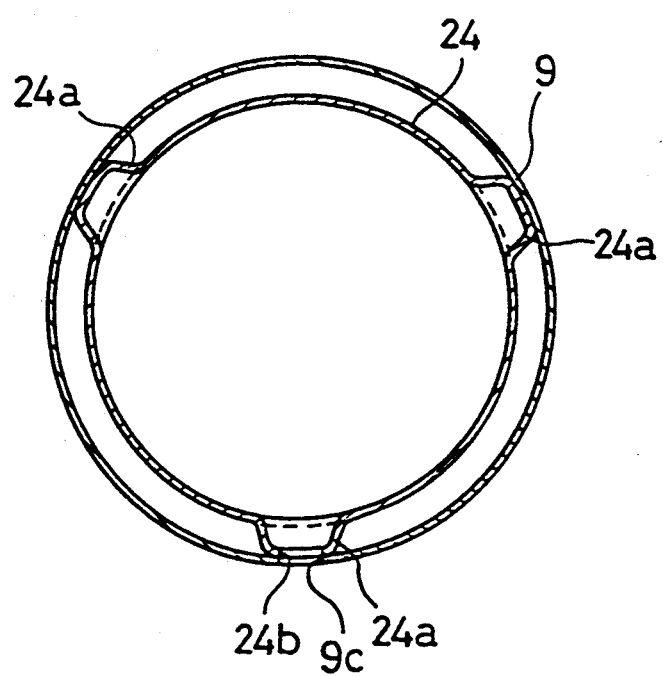
FIG. 7 is a cross-sectional view taken along line VII—VII of FIG. 6.

As shown in FIGS. 6 and 7 a motor frame outer barrel 24 has a plurality of radially outwardly projecting axial rib pairs each comprising two ribs 24a that are axially spaced from each other by a circular wall 24c held in contact with the stator 27 (see FIG. 5). The two ribs 24a of each rib pair are identical in dimension and shape to each other. As shown in FIG. 7, there are three circumferentially spaced rib pairs on the outer circumferential surface of the motor frame outer barrel 24. The maximum outside diameter of the ribs 24a and the inside diameter of the outer cylinder 9 are selected such that the ribs 24a are press-fitted or forcibly fitted in the outer cylinder 9.

Three pairs of ribs 24a is advantageous. If there were four or more rib pairs, then it would be difficult to keep a desired level of accuracy of the outside diameter of the ribs 24a and the inside diameter of the outer cylinder 9, resulting in a substantial reduction in the rate of production of the full-circumferential flow in-line pump. If the ribs 24a were welded to the outer cylinder 9 with such poor dimensional accuracy, internal stresses would develop in the ribs 24a and the outer cylinder 9, making them low in durability. One of the ribs 24a has a lead hole 24b through which leads of the motor extend.

Figure 8:
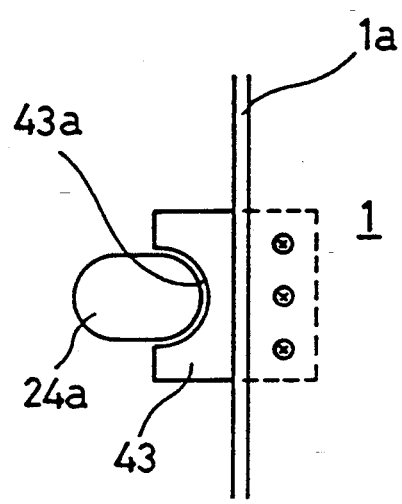
FIG. 8 is an enlarged fragmentary plan view of a mechanism for preventing a pump casing from rotating in the full-circumferential flow in-line pump of FIG. 5.

Further, in this embodiment shown in FIG. 5, a mechanism for preventing the suction- and discharge-side casings from rotating is provided. As shown in FIGS. 5 and 8, an engaging member 43 with a U-shaped recess 43a defined in an end thereof is welded to the inner surface of an open and of each of the suction- and discharge-side casings 1, 5. The ribs 24a of one rib pair on the motor frame outer barrel 24 have respective ends engaging in the U-shaped recesses 43a of the engaging members 43. In FIG. 8, only the suction-side casing 1, one engaging member 43, and one rib 24a are shown. Since the ribs 24a engage the engaging members 43, the suction- and discharge-side casings 1, 5 are prevented from rotating relatively to the flanges 20A, 20B, 21A, 21B under torsional forces applied to the casings 1, 5. In this embodiment, the flanges 1a, 5a may be of a small size as no recesses are required to be formed in the flanges 1a, 5a for the purpose of preventing the casings 1, 5 from rotating.

Figure 9:
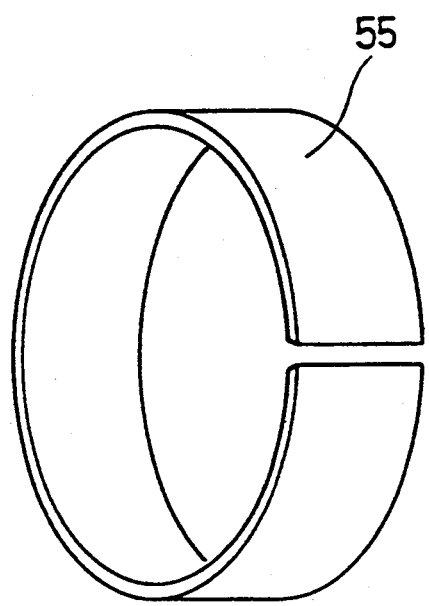
FIG. 9 is a perspective view of a reinforcing band in the full-circumferential flow in-line pump of FIG. 5.

Furthermore, in this embodiment, a reinforcing band 55 is bonded to the outer surface of the outer cylinder 9 to prevent the outer cylinder 9 from being deformed by internal pressure developed therein. The reinforcing band 55 is positioned between two ribs 24a adjacent to each other. The reinforcing band 55 is manufactured by forming a flat band plate into a cylindrical shape as shown in FIG. 9.

According to this embodiment, the reinforcing band 55 prevents the outer cylinder 9 from being deformed by internal pressure developed therein. Therefore, tensile loads applied to the bonding portion of the ribs 24a and the outer cylinder 9 of the pump casing are reduced, and the outer cylinder 9 can be manufactured as a thin plate.

The other details of the full-circumferential flow in-line pump shown in FIGS. 5 through 9 are the same as those of the full-circumferential flow in-line pump shown in FIGS. 1 through 4.

According to the second embodiment of the present invention, the pump casing is divided into the suction-side outer and inner casings 1, 10, and the inner casing 10 is further divided into the first and second inner casings 11a, 12a. The divided portions are sealed from each other by the resilient seal 44 across which the differential pressure between the suction and discharge pressures is applied.

The second inner casing 12a is floatingly supported at both ends thereof by the resilient seals 14 and 44. Therefore, even if the suction-side outer casing 1 is deformed by external forces such as piping forces, the second inner casing 12a can be freely displaced with respect to the first inner casing 11a serving as a fulcrum, and thus the first inner casing 11a is prevented from being deformed. Inasmuch as the first inner casing 11a is not substantially deformed, there is maintained a clearance between the first inner casing 11a and the impeller 15 for keeping the first inner casing 11a out of contact with the impeller 15.

Since the inner casing 10 is divided into the first and second inner casings 11a, 12a, the contraction percentage (H/D) becomes small during the press working. Consequently, the inner casing may easily be pressed to shape, compared with an integral inner casing of the first embodiment.

Further, the ribs 24a and the circular wall 24c axially positioned between the two ribs 24a of each rib pair are affective to maintain the motor frame outer barrel 24 rigid enough to tighten the laminated stator core with sufficient forces when the stator core is pressed into the motor frame outer barrel 24. If a motor with a different motor output (Mkw) is to be used, and hence its laminated stator core has a different thickness (L), its motor frame outer barrel 24 may be formed using the same rib-forming dies as those used to press the other motor frame outer barrels because the rib-forming dies are only required to move axially to form ribs in a position that matches the thickness of the laminated stator core.

Since the motor frame outer barrel 24 and the outer cylinder 9 are formed by metal sheets, when the motor frame outer barrel 24 is pressed into the outer cylinder 9, the ribs 24a are held in intimate contact with the inner surface of the outer cylinder 9 while their dimensions are being adjusted through their pressed engagement, so that their welded strength can reliably be controlled.

Figure 10C:
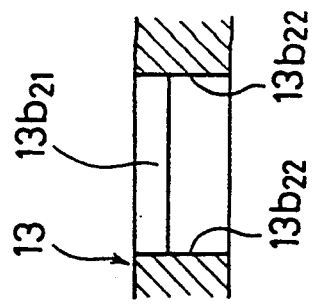
FIG. 10(c) is a partial cross-sectional view in the direction of arrow X(c) in FIG. 10(a)
Figure 10B:
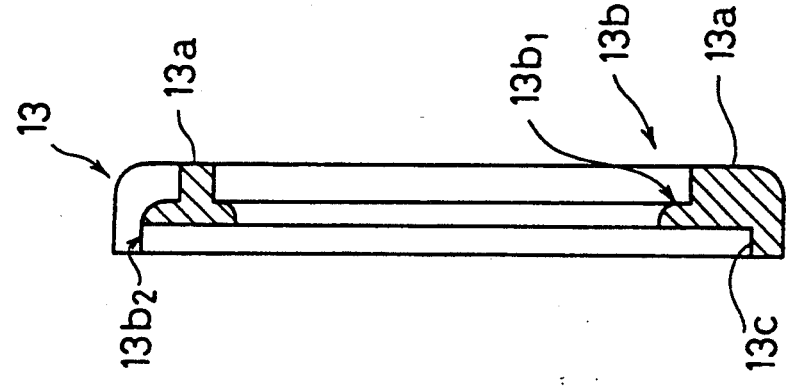
FIG. 10(b) is a cross-sectional view taken along line X(b)—X(b) of FIG. 10(a)
Figure 10A:
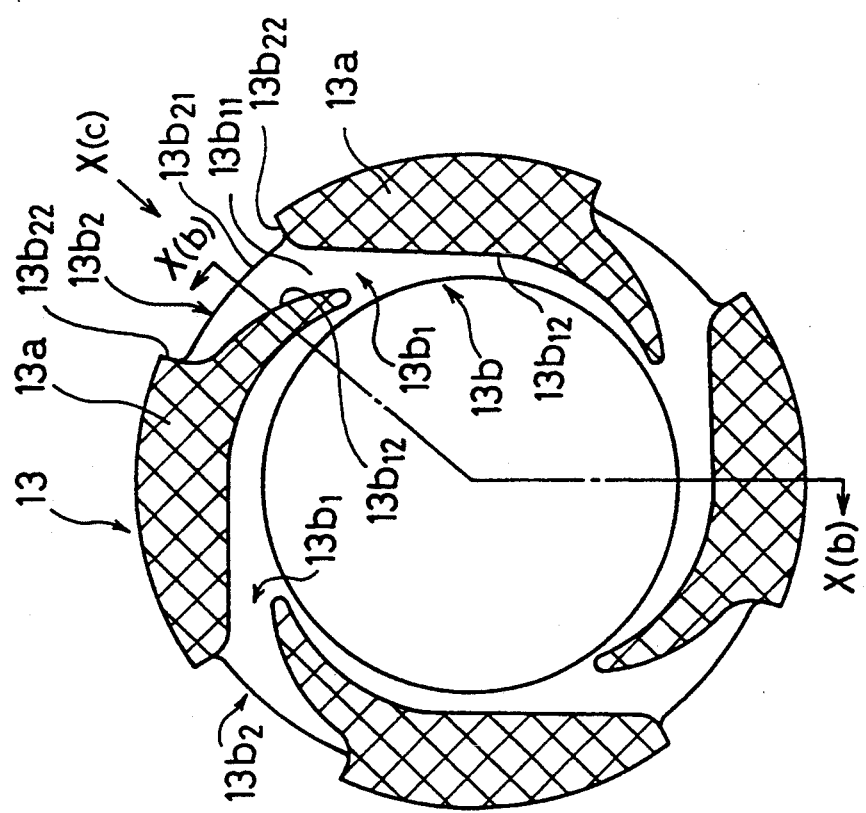
FIG. 10(a) is a cross-sectional view of a guide device in the full-circumferential flow in-line pump of FIGS. 1 and 5.

Next, the guide device 13 incorporated in the pump casing of the first and second embodiments will be described below in detail with reference to FIG. 10(a)–10(c). FIG. 10(a) is a side view of the guide device 13, FIG. 10(b) is a cross-sectional view taken along line X(b)—X(b) of FIG. 10(a), and FIG. 10(c) is a partial view as viewed in the direction indicated by the arrow x(c) of FIG. 10(a).

The guide device 13 is mounted on the radially inner surface of the inner casing 10. The guide device 13 has a plurality of fluid passages 13b for guiding fluid discharged from the impeller 15 from a radial direction toward an axial direction as shown in FIG. 10(b). The guide device 13 is made up of plastic, bronze (BC) or the like.

The guide device 13 has a front face 13a (an area shown by hatching in FIG. 10(a)) contacting the inner surface of the inner casing 10, the fluid passage 13b recessed from the front face 13a, and a cylindrical wall 13c serving as the female member of a spigot joint. The fluid passage 13b comprises a plurality of radial fluid passages 13b, extending radially outwardly and a plurality of axial fluid passages $13b_2$ extending axially from the radial fluid passage $13b_1$. The radial fluid passage $13b_1$ is defined by a bottom wall $13b_{11}$ and side walls $13b_{12}$, $13b_{12}$. The sectional area of the radial fluid passage $13b_1$ gradually increases in the flow direction of fluid. The axial fluid passage $13b_2$ is defined by a bottom wall $13b_{21}$ and side walls $13b_{22}$, $13b_{22}$ extending in parallel to an axis of the main shaft 16.

With the guide device 13 thus constructed, fluid discharged from the impeller 15 is guided in a radial direction by the radial fluid passages $13b_1$, and then changes its direction from the radial direction to an axial direction by the axial fluid passages $13b_2$. The fluid is smoothly guided in the axial direction by the side walls $13b_{22}$, $13b_{22}$ extending parallel to the axis of the main shaft 16 without a remaining radial component of velocity.

The guide device 13 is provided in the inner casing 10 housed in the suction-side outer casing 1 in spaced relationship thereto. Even if the suction-side outer casing 1 is deformed by external forces such as piping force, such deformations of the suction-side outer casing 1 are not transmitted to the inner casing 10. Thus the guide device 13 is not affected by deformations of the suction-side outer casing 1.

Accordingly, in order to prevent the guide device 13 from being deformed by external forces, the pump casing is not required to have a thickness greater than that necessary to withstand the internal pressure developed in the pump casing, and is not required to be reinforced by a special reinforcing member. Further, the guide device 13 can be freely designed without limitation of shape.

Since the guide device 13 is not required to be fixed to the pump casing by welding, the guide device 13 is not restricted by material and can be made up of plastic material or the like. Further, in the event that a small size impeller is used, only the guide device need be replaced with a new one, and the pump casing is not required to be changed in accordance with the size of the impeller.

Inasmuch as the inner casing for accommodating the guide device is provided, the shape of the suction-side outer casing 1 is not influenced by the guide device for obtaining a desired hydrodynamic performance. Therefore, the suction-side casing 1 can conform in shape to the discharge-side casing 5 and a common casing can be used as either the suction-side casing or discharge-side casing.

Next, a full-circumferential flow in-line pump according to a third embodiment of the present invention will be described below with reference to FIGS. 11 through 13. Those parts of the full-circumferential flow in-line pump shown in FIGS. 11 through 13 which are structurally and functionally identical to those shown in FIG. 1 through 4 are denoted by identical reference characters, and will not be described in detail.

Figure 11:
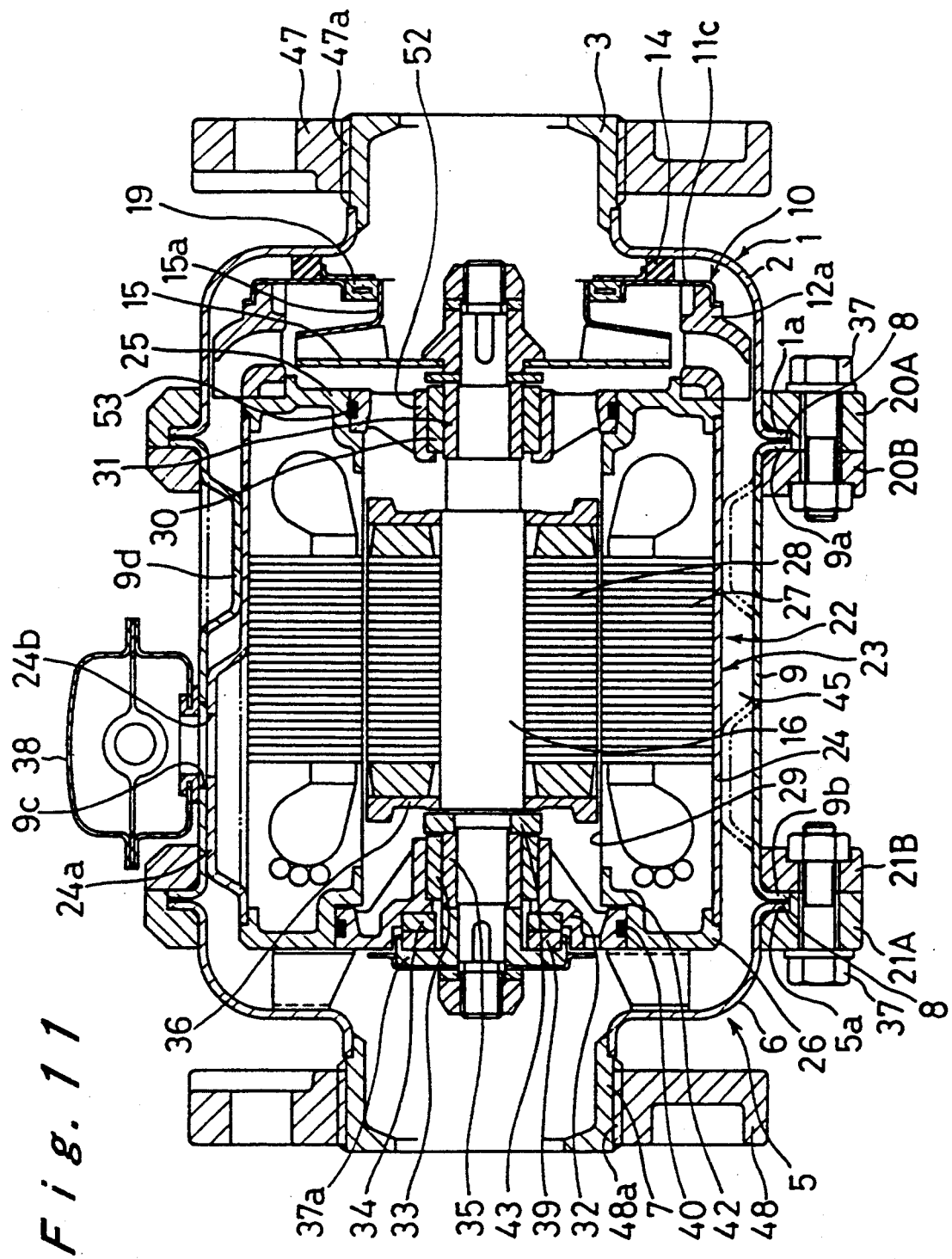
FIG. 11 is a cross-sectional view of a full-circumferential flow in-line pump according to a third embodiment of the present invention.

In this embodiment, as shown in FIG. 11 a seal member 8 is interposed between the flanges 1a, 9a of the suction-side casing 1 and the outer cylinder 9. Similarly, a seal member 8 is interposed between the flanges 5a, 9b of the discharge-side casing 5 and the outer cylinder 9. The suction-side casing 1 and the outer cylinder 9 are connected to each other by the flanges 1a, 9a through the seal member 8. The discharge-side casing 5 and the outer cylinder 9 are connected to each other by the flanges 5a, 9b through the seal member 8. Therefore, there is a low possibility that the vibration of the canned motor 22 is transmitted to the suction-side casing 1 and the discharge-side casing 5, and then to the pipe-line connected to the pump. Thus, resonance of the pipe-line due to propagation of the vibrations of the canned motor 22 is prevented. The suction-side casing 1 comprises a cylindrical cup-shaped body 2 and a cylindrical suction nozzle 3 connected to the cylindrical cup-shaped body 2 and extending axially into a suction region from the cylindrical cup-shaped body 2. Similarly, the discharge-side casing 5 comprises a cylindrical cup-shaped body 6 and a cylindrical discharge nozzle 7 connected to the cylindrical cup-shaped body 2 and extending axially into a discharge region from the cylindrical cup-shaped body 6.

The full-circumferential in-line pump also has an inner casing 10 disposed radially inwardly of the suction-side casing 1. The inner casing 10 comprises a partition plate 11c made of sheet metal such as stainless steel and positioned at the suction side, and a guide device 12d made of plastic or the like and connected to the partition plate 11c. The guide device 12d, which defines guide vanes or a volute, is fitted over a frame side plate 25 of the canned motor 22 in a socket- and-spigot joint. The frame side plate 25 of the canned motor 22 is of a highly rigid structure and the guide device 12d is supported on the frame side plate 25 of the canned motor 22. As a result, the inner casing 10 is supported by the highly rigid frame side plate 25 of the canned motor 22.

A resilient seal 14 is disposed in a gap defined between the partition plate 11c of the inner casing 10 and the suction-side casing 1 to seal a suction side (low-pressure side) in the pump from a discharge side (high-pressure side) in the pump.

A bearing housing 52 is detachably fastened to the frame side plate 25 with a resilient O-ring 53 being interposed between the bearing housing 52 and the frame side plate 25. The bearing housing 52 and the side plate 25 are joined to each other by a socket-and spigot joint with a clearance fit with the O-ring 53 disposed therein.

The outer cylinder 9 has a plurality of ribs 9d projecting radially inwardly from an outer circumferential surface thereof. As shown in FIGS. 12 and 13, the ribs 9d are integrally formed in the outer cylinder 9 by embossing, and have inner surfaces fitted over and spot-welded or otherwise joined to the outer surface of the frame outer barrel 24 of the canned motor 22.

The frame outer barrel 24 is formed with a rib 24a having a lead hole 24b through which leads of the motor 22 extend. The leads also extend through an opening 9c defined in the outer cylinder 9 into a terminal box 38 that is mounted on the outer cylinder 9 as shown in FIG. 11.

In the embodiments as shown in FIGS. 1 through 10, there is a possibility that air is confined between the ribs 24a of the frame outer barrel 24 and the core of the stator 27. Since the thermal conductivity of air is far lower than that of metal, cooling effect is reduced due to the existence of the plurality of the ribs 24a.

Figure 12:
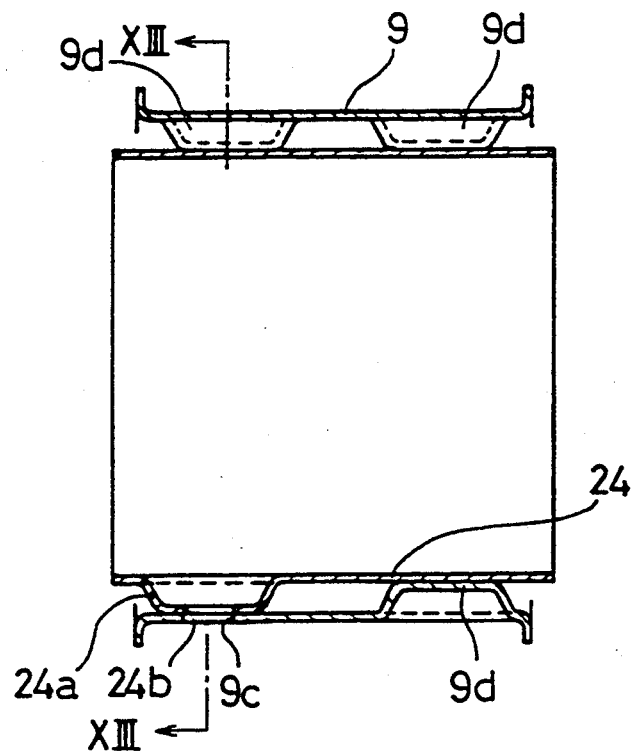
FIG. 12 is a cross-sectional view of a motor frame and an outer cylinder of the full-circumferential flow in-line pump shown in FIG. 11.
Figure 13:
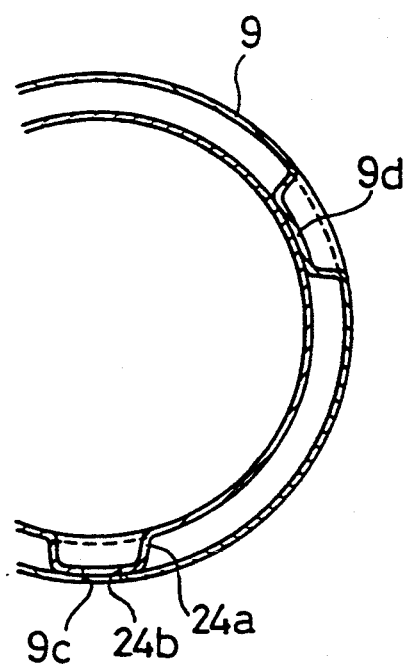
FIG. 13 is a cross-sectional view taken along line XIII—XIII of FIG. 12.

In contrast, almost the whole surface of the frame outer barrel 24 contacts the core of the stator 27 except for the single rib 24a for taking out leads in the embodiment shown in FIGS. 11 through 13, resulting in improving cooling effect of the motor and downsizing of the motor.

Figure 14:
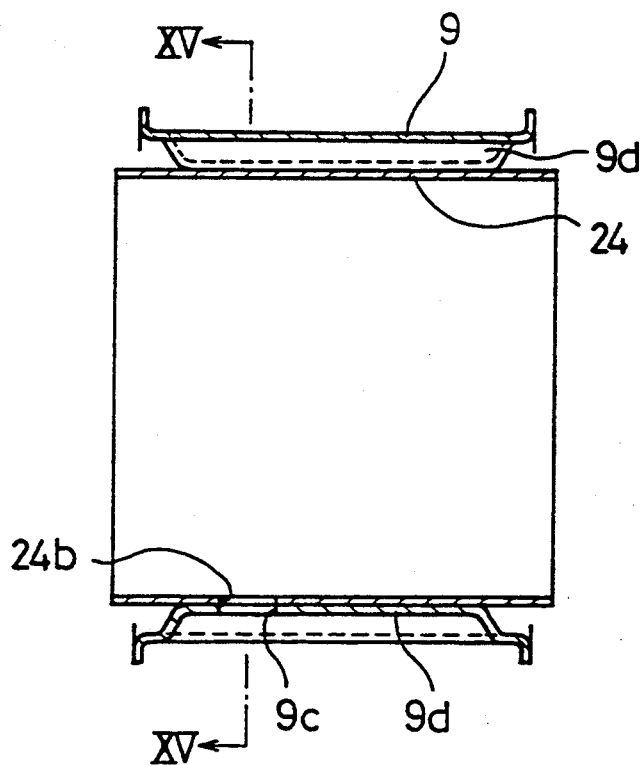
FIG. 14 is a cross-sectional view of a modified embodiment corresponding to the embodiment in FIG. 12.
Figure 15:
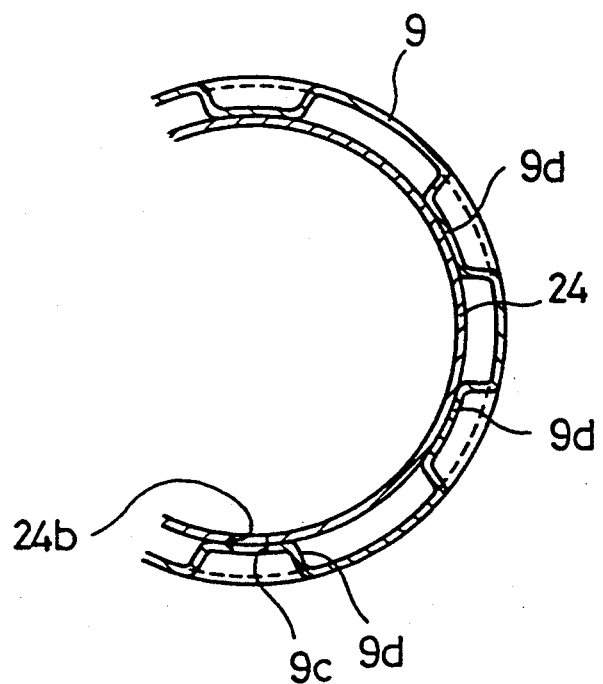
FIG. 15 is a cross-sectional view taken along line XV—XV of FIG. 14.

Next, a modified embodiment will be described below with reference to FIGS. 14 and 15.

In this embodiment, all of the ribs 9d are formed on the outer cylinder 9 of the pump casing. To be more specific, a rib 9d for taking out leads is also formed on the outer cylinder 9. A lead hole 9c through which leads of the motor 22 extend is formed on the rib 9d facing a lead hole 24b of the frame outer barrel 24.

According to this embodiment, the whole outer surface of the stator 27 contacts the inner surface of the frame outer barrel 24, resulting in further improving cooling effect of the motor.

Figure 16:
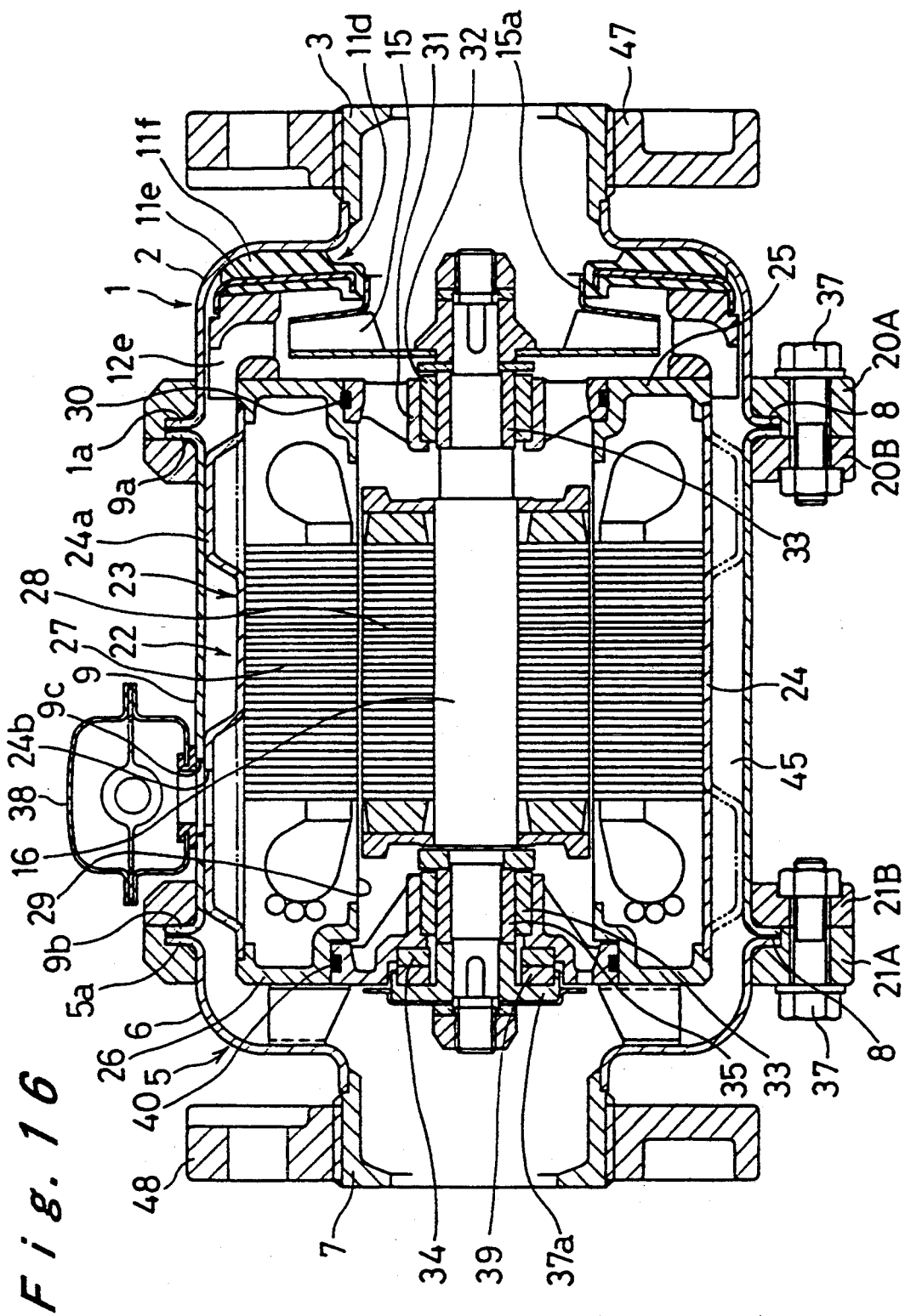
FIG. 16 is a cross-sectional view of a full-circumferential flow in-line pump according to a fourth embodiment of the present invention.

A full-circumferential flow in-line pump according to a fourth embodiment of the present invention will be described below with reference to FIG. 16. Those parts shown in FIG. 16 which are structurally and functionally identical to or similar to those shown FIG. 11 are denoted at identical reference numerals, and explanation thereof will be omitted.

In this embodiment, the full-circumferential flow in-line pump has an inner casing 10 disposed radially inwardly of the suction-side casing 1. The inner casing 10 comprises a partition wall 11d positioned at the suction side, and a guide device 12e made of plastics or the like and connected to the partition wall 11d. The partition wall 11d comprises a core member 11e made of steel plate and a resilient member 11f made of rubber and molded on the core member 11e. The resilient member 11f constitutes a resilient seal to prevent a pumped fluid from leaking towards a suction side of the impeller 15. The guide device 12e, which serves as guide vanes or a volute, is fitted over a frame side plate 25 of the canned motor 22 in a socket-and-spigot joint.

Figure 17:
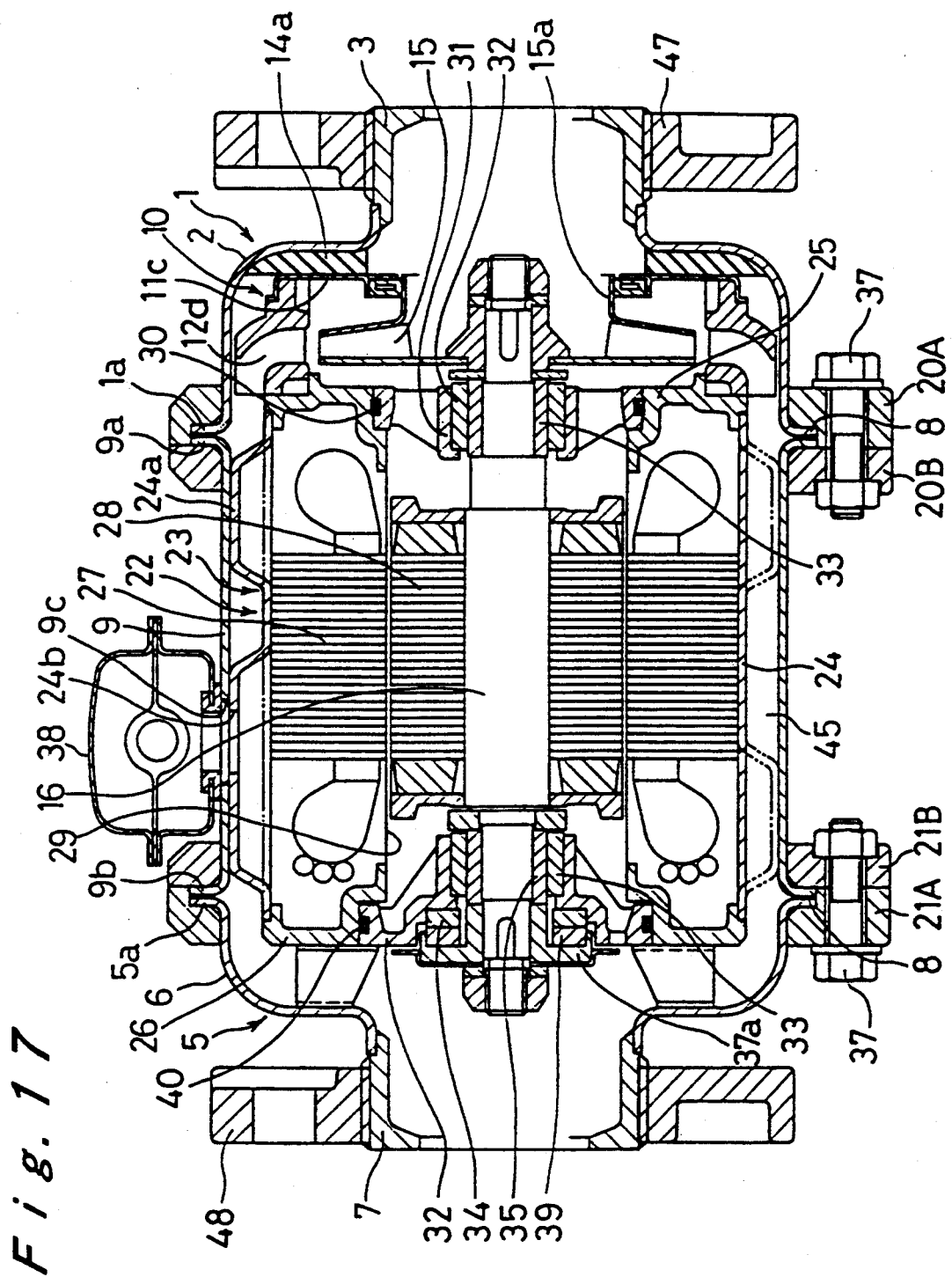
FIG. 17 is a cross-sectional view of a full-circumferential flow in-line pump according to a fifth embodiment of the present invention.
Figure 18:
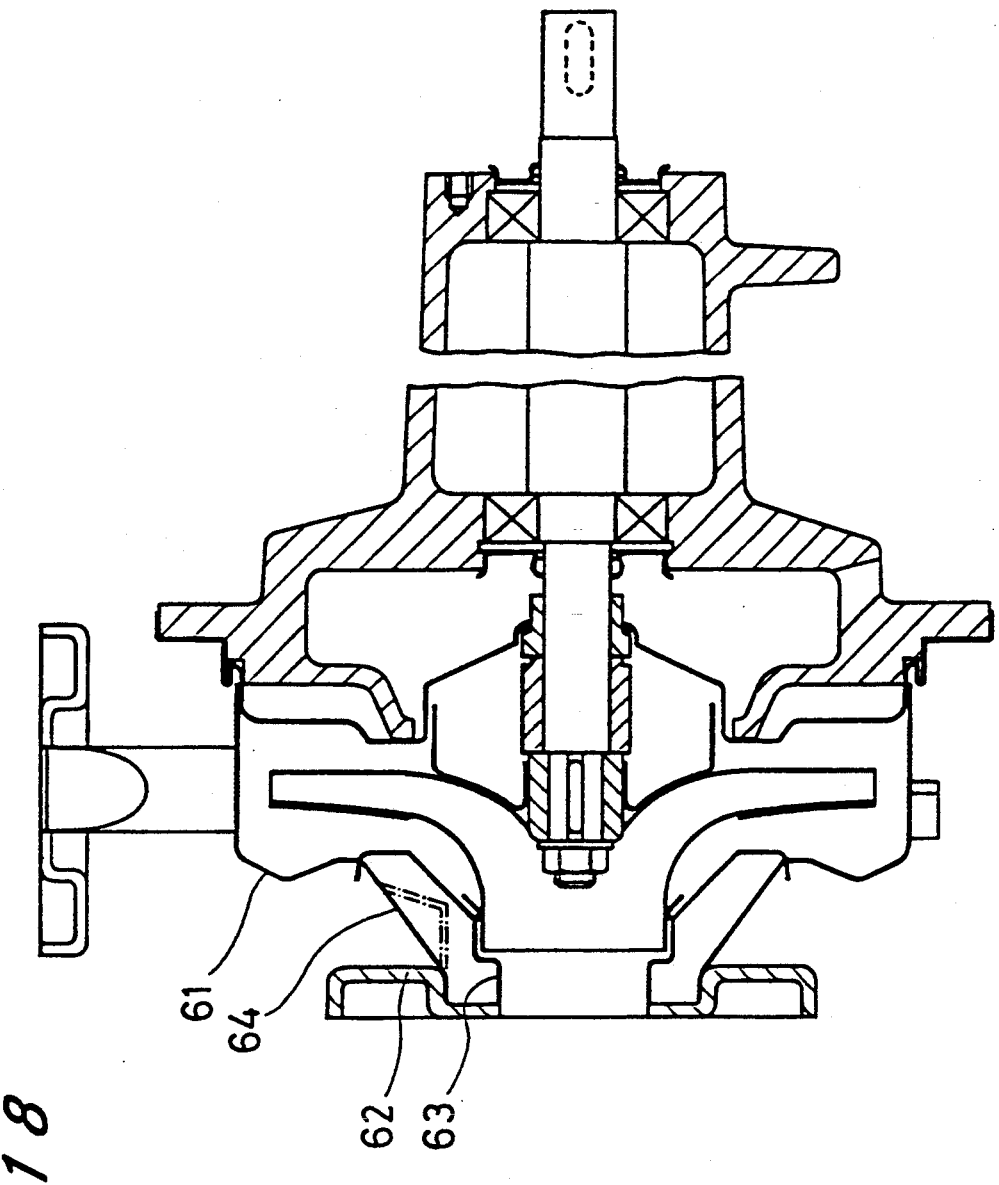
FIG. 18 is a cross-sectional view of a conventional pump casing made of sheet metal.

A full-circumferential flow in-line pump according to a fifth embodiment of the present invention will be described below with reference to FIG. 17. Those parts shown in FIG. 17 which are structurally and functionally identical to or similar to those shown FIG. 11 are denoted at identical reference numerals, and explanation thereof will be omitted.

In this embodiment, the full-circumferential flow in-line pump has an inner casing 10 disposed radially inwardly of the suction-side casing 1. The inner casing 10 comprises a partition plate 11c made of sheet metal such as stainless steel and positioned at the suction side, and a guide device 12d made of plastics or the like and connected to the partition plate 11c. The suction-side casing 1 has an inner surface on which a resilient seal 14a is integrally provided by adhesion or molding. The resilient seal 14a contacts the partition plate 11c to prevent a pumped fluid from leaking towards a suction side of the impeller 15. The guide device 12d, which serves as guide vanes or a volute, is fitted over a frame side plate 25 of the canned motor 22 in a socket-and-spigot joint.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A pump casing made of sheet metal, comprising:
   an outer casing made of sheet metal;
   an inner casing housed in said outer casing and spaced therefrom for accommodating an impeller in said pump casing, said inner casing having a portion made of sheet metal; and
   a resilient seal disposed between said outer casing and said inner casing and separating said outer using and said inner casing such that perturbations of said outer casing and said inner casing are substantially absorbed by said resilient seal and transmission of said perturbations between said inner and outer casings is substantially inhibited.

2. The pump casing made of sheet metal according to claim 1, wherein said inner casing comprises an integral member made of sheet metal.

3. The pump casing made of sheet metal according to claim 2, further comprising a guide device housed in said inner casing for guiding fluid discharged from the impeller.

4. The pump casing made of sheet metal according to claim 1, wherein said inner casing includes a guide device for guiding fluid discharged from the impeller.

5. The pump casing made of sheet metal according to claim 1, wherein said inner casing has a portion extending around the impeller with a clearance defined therebetween when said pump casing is combined with a pump having the impeller.

6. The pump casing made of sheet metal according to claim 1, wherein said inner casing has a portion supporting a liner ring extending around the impeller with a clearance defined therebetween when said pump casing is combined with a pump having the impeller and the liner ring.

7. The pump casing according to claim 1, wherein said outer casing and said inner casing are concentric to one another.

8. The pump casing according to claim 1, wherein said outer casing and said inner casing are not in contact with one another.

9. A pump casing made of sheet metal, comprising:
an outer casing made of sheet metal; an inner casing housed in said outer casing, said inner casing comprising a first inner casing for accommodating the impeller, and a second inner casing connected to said first inner casing and defining a suction fluid passage; and
a resilient seal disposed between said outer casing and said inner casing.

10. The pump casing made of sheet metal according to claim 9, further comprising a second resilient seal interposed between said first inner casing and said second inner casing.

11. A full-circumferential flow pump having a pump casing encasing a motor driving an impeller for pumping a fluid with a circumferential passage separating said pump casing and an outer circumferential surface of said motor, said pump casing comprising:
a suction-side casing made of sheet metal;
an inner casing housed in said suction-side casing for accommodating said impeller in said pump casing; and
sealing means in said pump casing and made of resilient material, said sealing means separating said outer casing and said inner casing such that perturbations of said inner and outer casings are substantially absorbed by said sealing means and transmission of said perturbations between said inner and outer casings is substantially inhibited, said sealing means preventing a pumped fluid in said pump casing from leaking towards a suction side of said impeller.

12. The full-circumferential flow pump according to claim 18, wherein said inner casing is supported by said motor.

13. The full-circumferential flow pump according to claim 12, wherein said sealing means is disposed between said suction-side casing and said inner casing.

14. The full-circumferential flow pump according to claim 11, further comprising a guide device housed in said inner casing for guiding fluid discharged from said impeller.

15. The full-circumferential flow according to claim 11, wherein said inner casing includes a guide device for guiding fluid discharged from said impeller.

16. The full-circumferential flow pump according to claim 11, wherein said inner casing has an open end remote from said suction nozzle and supported by a motor frame of said motor.

17. The full-circumferential flow pump according to claim 11, wherein said inner casing has a portion extending around said impeller with a clearance defined therebetween.

18. The full-circumferential flow pump according to claim 11, including a liner ring, wherein said inner casing has a portion for supporting the liner ring and extending around said impeller with a clearance defined therebetween.

19. The full-circumferential flow pump according to claim 11, wherein said sealing means is formed on one of said suction-side casing and said inner casing.

20. The full-circumferential flow pump casing according to claim 11, wherein said outer casing and said inner casing are concentric to one another.

21. The full-circumferential flow pump casing according to claim 11, wherein said outer casing and said inner casing are not in contact with one another.

22. A full-circumferential flow pump, comprising:
a suction side casing made of sheet metal;
an inner casing housed in said suction-side casing, said inner casing comprising a first inner casing for accommodating said impeller, and a second inner casing connected to said first inner casing and defining a suction fluid passage; and
sealing means in said pump casing and made of resilient material for preventing a pumped fluid in said pump casing from leaking towards a suction side of said impeller.

23. The full-circumferential flow pump according to claim 22, further comprising a second resilient seal interposed between said first inner casing and said second inner casing.

24. A full-circumferential flow pump having a pump casing encasing a motor driving an impeller for pumping a fluid with a circumferential passage separating said pump casing and an outer circumferential surface of said motor, said pump casing comprising:
a suction-side casing made of sheet metal and having a suction nozzle;
an outer cylinder connected to said suction-side casing and accommodating said motor in said pump casing, said outer cylinder being made of sheet metal and supporting said motor;
an inner casing housed in said suction-side casing for accommodating the impeller in said pump casing; and
sealing means in said pump casing and made of resilient material, said sealing means separating said outer casing and said inner casing such that perturbations of said inner and outer casings are substantially absorbed by said sealing means and transmission of said perturbations between said inner and outer casings is substantially inhibited, said sealing means preventing a pumped fluid in said pump casing from leaking towards a suction side of said impeller.

25. A full-circumferential flow pump having a pump casing encasing a motor driving an impeller for pumping a fluid with a circumferential passage separating said pump casing and an outer circumferential surface of said motor, said pump casing comprising:

a suction-side casing made of sheet metal and having a suction nozzle, said suction-side casing having a flange extending radially outwardly from an open end thereof;

an outer cylinder connected to said suction-side casing and accommodating said motor in said pump casing, said outer cylinder made of sheet metal and having a flange extending radially outwardly from an open end thereof;

an inner casing housed in said suction-side casing and accommodating said impeller in said pump casing;

sealing means in said pump casing and made of resilient material, said sealing means separating said outer casing and said inner casing such that perturbations of said inner and outer casing are substantially absorbed by said sealing means and transmission of said perturbations between said outer casing and said inner casing is substantially inhibited, said sealing means preventing a pumped fluid in said pump casing from leaking towards a suction side of said impeller; and holding means for holding said flanges of said suction-side casing and said outer cylinder so as to connect said flanges.

26. The full-circumferential flow pump according to claim 25, wherein said holding means comprises a pair of clamping flanges for clamping said flanges of said suction-side casing and said outer cylinder.

27. The full-circumferential flow pump according to claim 25, further comprising a seal member interposed between said flanges of said suction-side casing and said outer cylinder.

28. A full-circumferential flow pump, having a pump casing encasing a motor driving an impeller for pumping a fluid with a circumferential passage separating said pump casing and an outer circumferential surface of said motor, said pump casing comprising:

a suction-side casing made of sheet metal and having a suction nozzle;

an outer cylinder made of sheet metal and connected to said suction-side casing, said outer cylinder accommodating said motor in said pump casing;

fixing means for fixing said motor to said outer cylinder, said fixing means including a plurality of ribs projecting outwardly from one of a frame outer barrel of said motor and said outer cylinder, said ribs being fitted to the other of said frame outer barrel and said outer cylinder; and an engaging member attached to said suction-side casing and engaging one of said ribs to prevent said suction-side casing from rotating.

29. A full-circumferential flow pump having a pump casing encasing a motor driving an impeller for pumping a fluid with a circumferential passage separating said pump casing and an outer circumferential surface of said motor, said pump casing comprising:

a suction-side casing made of sheet metal and having a suction nozzle;

a discharge-side casing made of sheet metal and having a discharge nozzle;

an outer cylinder interconnecting said suction-side casing and said discharge-side casing;

an inner casing housed in said suction-side casing for accommodating an impeller in said pump casing; and sealing means in said pump casing and made of resilient material, said sealing means separating said outer casing and said inner casing such that perturbations of said inner and outer casings are substantially absorbed by said sealing means and transmission of said perturbations between said inner and outer casings is substantially inhibited, said sealing means preventing a pumped fluid in said pump casing from leaking towards a suction side of said impeller;

wherein said suction-side casing and said discharge-side casing are identical in dimension and shape to each other.

30. A full-circumferential flow pump having a pump casing encasing a motor driving an impeller for pumping a fluid with a circumferential passage separating said pump casing and an outer circumferential surface of said motor, said pump casing comprising:

a suction-side casing made of sheet metal and having a suction nozzle;

an outer cylinder connected to said suction-side casing and accommodating said motor in said pump casing, said outer cylinder being made of sheet metal and supporting said motor;

an inner casing housed in said suction-side casing for accommodating the impeller in said pump casing;

sealing means in said pump casing and made of resilient material, said sealing means separating said outer casing and said inner casing such that perturbations of said inner and outer casings are substantially absorbed by said sealing means and transmission of said perturbations between said inner and outer casings is substantially inhibited, said sealing means preventing a pumped fluid in said pump casing from leaking towards a suction side of said impeller; and fixing means for fixing said motor to said outer cylinder.

31. A pump casing made of sheet metal, comprising:

an outer casing made of sheet metal;

an inner casing housed in said outer casing and spaced therefrom for accommodating an impeller in said pump casing, said inner casing having a portion made of sheet metal; and a resilient seal disposed between said outer casing and said inner casing and separating said outer casing and said inner casing such that said outer casing and said inner casing are not in contact with one another by virtue of the separation provided by said resilient seal.

32. The pump casing made of sheet metal according to claim 31, wherein said inner casing comprises an integral member made of sheet metal.

33. The pump casing made of sheet metal according to claim 32, further comprising a guide device housed in said inner casing for guiding fluid discharged from the impeller.

34. The pump casing made of sheet metal according to claim 31, wherein said inner casing comprises a first inner casing for accommodating the impeller, and a second inner casing connected to said first inner casing and defining a suction fluid passage.

35. The pump casing made of sheet metal according to claim 34, further comprising a second resilient seal interposed between said first inner casing and said second inner casing.

36. The pump casing made of sheet metal according to claim 31, wherein said inner casing includes a guide device for guiding fluid discharged from the impeller.

37. The pump casing made of sheet metal according to claim 31, wherein said inner casing has a portion extending around the impeller with a clearance defined therebetween when said pump casing is combined with a pump having the impeller.

38. The pump casing made of sheet metal according to claim 31, wherein said inner casing has a portion supporting a liner ring extending around the impeller with a clearance defined therebetween when said pump casing is combined with a pump having the impeller and the liner ring.

39. The pump casing according to claim 31, wherein said outer casing and said inner casing are concentric to one another.

40. The pump casing according to claim 31, wherein said outer casing and said inner casing are not in contact with one another.

41. A full-circumferential flow pump having a pump casing encasing a motor driving an impeller for pumping a fluid with a circumferential passage separating said pump casing and an outer circumferential surface of said motor, said pump casing comprising:
   a suction-side casing made of sheet metal;
   an inner casing housed in said suction-side casing for accommodating said impeller in said pump casing; and
   sealing means in said pump casing and made of resilient material, said sealing means separating said outer casing and said inner casing such that said outer casing and said inner casing are not in contact with one another by virtue of the separation provided by said resilient seal.

42. The full-circumferential flow pump according to claim 41, wherein said inner casing is spaced from said suction-side casing and is supported by said motor.

43. The full-circumferential flow pump according to claim 42, wherein said sealing means is disposed between said suction-side casing and said inner casing.

44. The full-circumferential flow pump according to claim 41, further comprising a guide device housed in said inner casing for guiding fluid discharged from said impeller.

45. The full-circumferential flow pump according to claim 41, wherein said inner casing comprises a first inner casing for accommodating said impeller, and a second inner casing connected to said first inner casing and defining a suction fluid passage.

46. The full-circumferential flow pump according to claim 45, further comprising a second resilient seal interposed between said first inner casing and said second inner casing.

47. The full-circumferential flow according to claim 41, wherein said inner casing includes a guide device for guiding fluid discharged from said impeller.

48. The full-circumferential flow pump according to claim 41, wherein said inner casing has an open end remote from said suction nozzle and supported by a motor frame of said motor.

49. The full-circumferential flow pump according to claim 41, wherein said inner casing has a portion extending around said impeller with a clearance defined therebetween.

50. The full-circumferential flow pump according to claim 41, including a liner ring, wherein said inner casing has a portion for supporting the liner ring and extending around said impeller with a clearance defined therebetween.

51. The full-circumferential flow pump according to claim 41, wherein said sealing means is formed on one of said suction-side casing and said inner casing.

52. The full-circumferential flow pump casing according to claim 41, wherein said outer casing and said inner casing are concentric to one another.

53. The full-circumferential flow pump casing according to claim 41, wherein said outer casing and said inner casing are not in contact with one another.

* * * * *

UNITED STATES PATENT AND TRADEMARK OFFICE
CERTIFICATE OF CORRECTION

PATENT NO. : 5,401,146
DATED : MARCH 28, 1995
INVENTOR(S) : Masayoshi MORIYA ET AL It is certified that error appears in the above-indentified patent and that said Letters Patent is hereby corrected as shown below:

Column 12, line 60, please change "said outer using" to --said outer casing--.

Column 13, lines 59 & 60, please change "according to claim 18" to --according to claim 11--.

Signed and Sealed this

Twentieth Day of February, 1996

Attest:

BRUCE LEHMAN

Attesting Officer          Commissioner of Patents and Trademarks